(12) United States Patent
Oyama

(10) Patent No.: US 11,325,617 B2
(45) Date of Patent: May 10, 2022

(54) AUTOMATIC DRIVING SYSTEM

(71) Applicant: SUBARU CORPORATION, Tokyo (JP)

(72) Inventor: Hajime Oyama, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 161 days.

(21) Appl. No.: 16/744,878

(22) Filed: Jan. 16, 2020

(65) Prior Publication Data
US 2020/0307641 A1  Oct. 1, 2020

(30) Foreign Application Priority Data
Mar. 27, 2019  (JP) .............................. JP2019-061282

(51) Int. Cl.
*B60W 60/00*  (2020.01)
*B60W 40/08*  (2012.01)
(Continued)

(52) U.S. Cl.
CPC ........ *B60W 60/0053* (2020.02); *B60W 40/08* (2013.01); *G05D 1/0061* (2013.01); *G05D 1/0088* (2013.01); *G05D 1/0276* (2013.01); *B60W 2540/00* (2013.01); *B60W 2552/30* (2020.02); *B60W 2555/20* (2020.02); *B60W 2555/60* (2020.02); *B60W 2556/45* (2020.02)

(58) Field of Classification Search
CPC ............. B60W 60/0053; B60W 40/08; B60W 2556/45; B60W 2540/00; B60W 2555/20; B60W 2555/60; B60W 2552/30; B60W 30/16; B60W 50/082; B60W 50/14; B60W 30/12; G05D 1/0088; G05D 1/0061; G05D 1/0276; G06K 9/00375; G06K 9/00389; G06K 9/00845; H04N 7/183; H04N 7/18; B60K 35/00; B60K 28/04
USPC .................... 701/23, 25; 340/7.58, 7.59, 901
See application file for complete search history.

(56) References Cited

U.S. PATENT DOCUMENTS 7,333,006 B2 * 2/2008 Ogawa ................... G08G 1/163
340/438
2016/0303972 A1 * 10/2016 Kuhne ................. G05D 1/0088
(Continued)

FOREIGN PATENT DOCUMENTS

JP          6439667 B2    12/2018

*Primary Examiner* — Peter D Nolan
*Assistant Examiner* — Ellis Bernardo Ramirez
(74) *Attorney, Agent, or Firm* — McDermott Will & Emery LLP

(57) ABSTRACT

An automatic driving system includes a driver monitor, a driver state determining unit, a first automatic driving controller, and a second automatic driving controller. The first automatic driving controller controls a first automatic driving mode for causing a vehicle to travel by automatic driving under a preset first traveling environment regardless of whether a driver is in a forward monitoring state. The second automatic driving controller controls a second automatic driving mode for causing the vehicle to travel by the automatic driving in a situation where the driver state determining unit determines, based on a driver state detected by the driver monitor, that the driver is in the forward monitoring state, and the vehicle is under a second traveling environment which is more complicated than the first traveling environment.

15 Claims, 4 Drawing Sheets

(51) Int. Cl.
*G05D 1/00* (2006.01)
*G05D 1/02* (2020.01)

(56) References Cited

U.S. PATENT DOCUMENTS

2018/0329415 A1* 11/2018 Aoi .................... B60W 30/182
2018/0373250 A1* 12/2018 Nakamura ............ G05D 1/0061
2019/0086917 A1* 3/2019 Okimoto ................ B60W 30/00
2020/0117190 A1* 4/2020 Schmitt ................ A61B 5/0077
2020/0231182 A1* 7/2020 Oba .................. B60W 60/0053

* cited by examiner

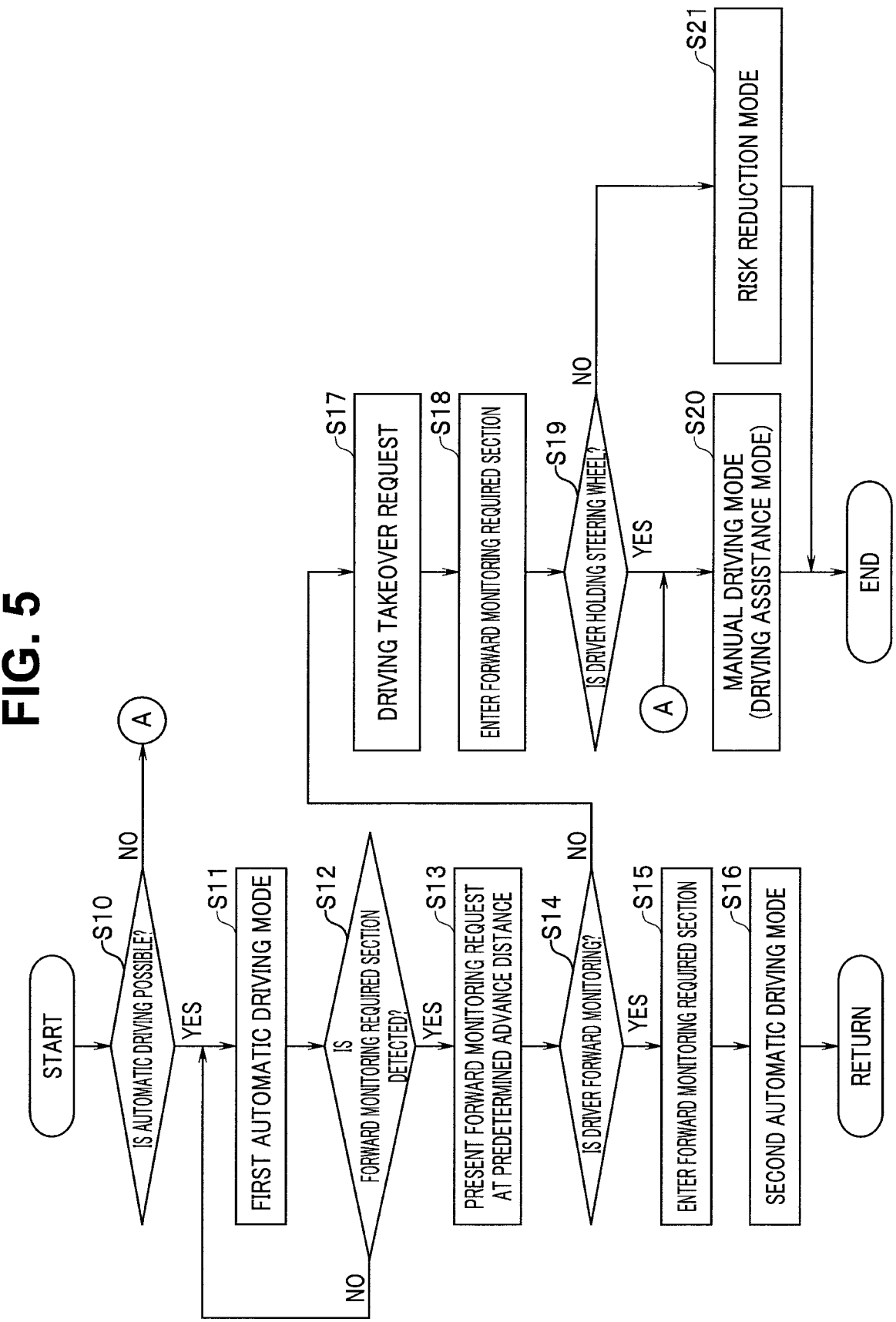

AUTOMATIC DRIVING SYSTEM

CROSS-REFERENCE TO RELATED APPLICATIONS

The present application claims priority from Japanese Patent Application No. 2019-061282 filed on Mar. 27, 2019, the entire contents of which are hereby incorporated by reference.

BACKGROUND

The technology relates to an automatic driving system capable of causing a vehicle to travel without requiring a driver's driving operation.

An automatic driving system that enables a vehicle to travel without requiring a driver's driving operation has been recently developed and put into practical use for vehicles such as automobiles. It has been predicted as a final level that this automatic driving system will undertake all functions by itself while including a case where an abnormality occurs. However, as a preliminary step, a conditional automatic driving system is known which warns a driver of difficulty in continuation of automatic driving and entrusts the driver with the driving when a vehicle gets out of an operation region which is targeted for the automatic driving.

For instance, Japanese Patent No. 6439667 discloses the following technique of issuing an alarm. Under a situation where it is determined that it is impossible to continue automatic driving, when a driver holds a steering wheel and a driver's visual line directs forward, an alarm is issued by using a head-up display. On the other hand, in either one or both of a state where the driver does not hold the steering wheel and a state where the driver's visual line does not direct forward, an alarm is issued by using a sound output device or a vibration output device in addition to the head-up display.

SUMMARY

An aspect of the technology provides an automatic driving system configured to cause a vehicle to travel by automatic driving without a driver's driving operation. The system includes a driver monitor, a driver state determining unit, a first automatic driving controller, and a second automatic driving controller. The driver monitor is configured to monitor, as a driver, an occupant capable of performing a driving operation in a vehicle compartment to detect a driver state. The driver state determining unit is configured to determine, on a basis of the driver state, whether the driver is in a forward monitoring state where the driver monitors a forward surrounding environment. The first automatic driving controller configured to control a first automatic driving mode for causing the vehicle to travel by the automatic driving under a preset first traveling environment regardless of whether the driver is in the forward monitoring state; and a second automatic driving controller configured to control a second automatic driving mode for causing the vehicle to travel by the automatic driving under a situation in which the driver state determining unit determines that the driver is in the forward monitoring state and the vehicle is under a second traveling environment which is more complicated than the first traveling environment.

Another aspect of the technology provides an automatic driving system including circuitry that is configured to cause a vehicle to travel by automatic driving without requiring a driver's driving operation, in which the circuitry is configured to execute: monitoring, as a driver, an occupant capable of performing a driving operation in a vehicle compartment to detect a driver state; determining, based on the driver state, whether the driver is in a forward monitoring state in which the driver monitors a forward surrounding environment; and controlling a first automatic driving mode for causing the vehicle to travel by the automatic driving under a preset first traveling environment regardless of whether the driver is in the forward monitoring state and a second automatic driving mode for causing the vehicle to travel by the automatic driving in a situation where the circuitry determines that the driver is in the forward monitoring state and the vehicle is in a second traveling environment which is more complicated than the first traveling environment.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 5 is a flowchart illustrating transition processing of the driving mode.

DETAILED DESCRIPTION

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In a known automatic driving system, when the driving environment of automatic driving deteriorates, the frequency of canceling the automatic driving increases, which may reduce convenience as an automatic driving vehicle and give a driver insufficient time for taking over driving.

Therefore, it is desirable to provide an automatic driving system that is capable of continuing automatic driving as long as possible according to a driver's condition even when a driving environment of the automatic driving deteriorates, and enhancing convenience as an automatic driving vehicle while ensuring safety.

Figure 1:
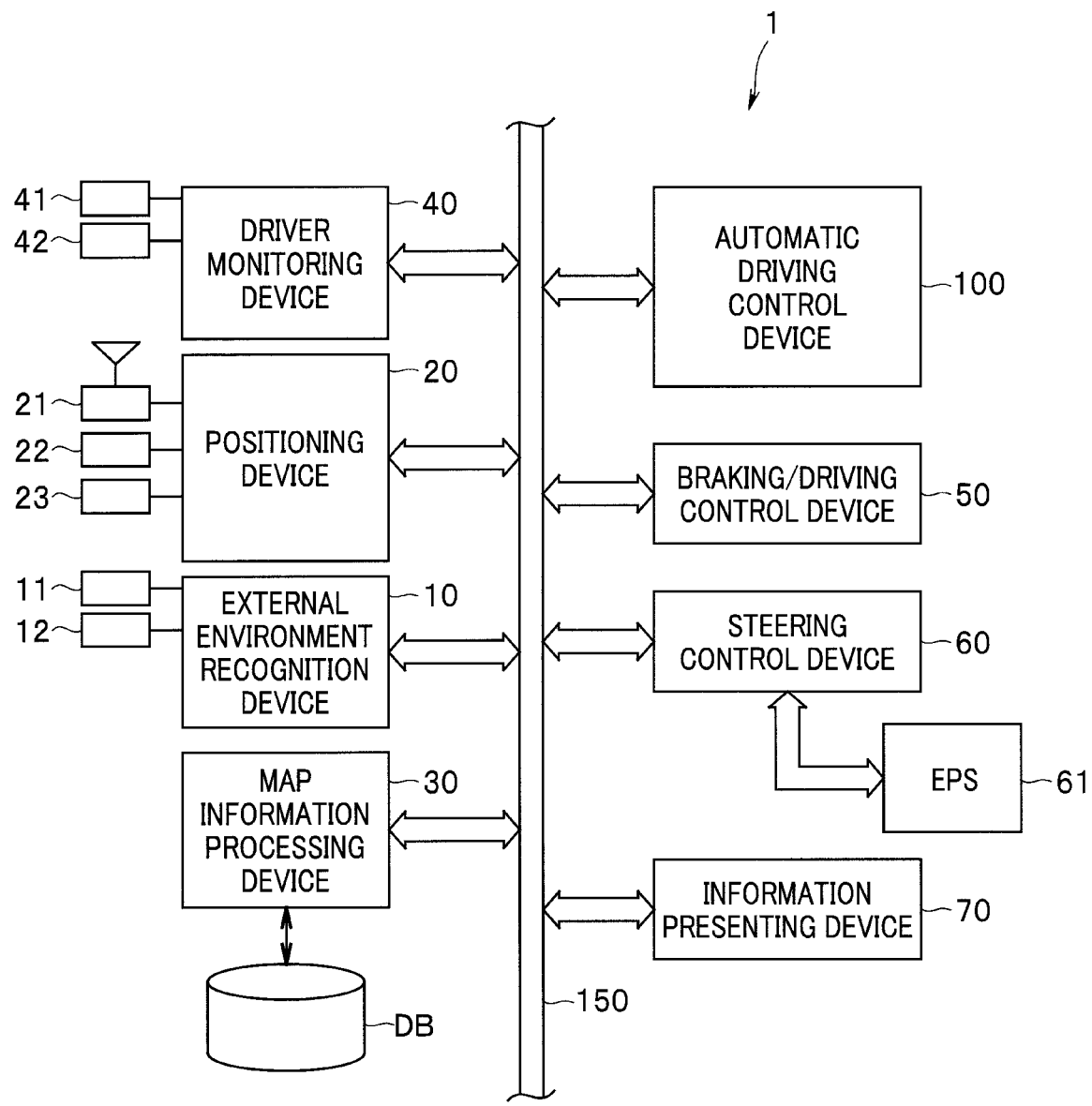
FIG. 1 is an overall configuration diagram of an automatic driving system.

An embodiment of the technology will be described below with reference to the drawings. FIG. 1 is an overall configuration diagram of an automatic driving system. The automatic driving system 1 illustrated in FIG. 1 is installed in a vehicle such as an automobile, and enables driving assistance for assisting a driver's driving operation and automatic driving that does not require the driver's driving operation. Specifically, the automatic driving system 1 is configured by connecting an automatic driving control device 100 serving as a main component, an external environment recognition device 10, a positioning device 20, a map information processing device 30, a driver monitoring device 40, a braking/driving control device 50, a steering control device 60, an information presenting device 70 and the like to one another through a communication bus 150 in a network connection style.

The external environment recognition device 10 recognizes an external environment around a vehicle (own vehicle) in which the automatic driving system 1 is installed. The external environment recognition device 10 includes various devices that recognize an environment such as a camera unit 11 and a radar device 12 such as a millimeter wave radar or a laser radar. The external environment recognition device 10 recognizes the external environment around the own vehicle based on detection information on objects around the own vehicle detected by the camera unit 11, the radar device 12, etc., traffic information acquired by infrastructure communication such as road-to-vehicle communication and vehicle-to-vehicle communication, position information of the own vehicle measured by the positioning device 20, map information from the map information processing device 30 and the like.

In the external environment recognition device 10, for instance, when a stereo camera configured by two cameras that capture images of the same object from different viewpoints is mounted as the camera unit 11 in the own vehicle, a pair of right and left images captured by the stereo camera are subjected to stereo processing to recognize the external environment three-dimensionally. The camera unit 11 as the stereo camera is configured, for instance, by disposing two shutter-synchronized color cameras each having an imaging element such as CCD or CMOS on right and left sides in a vehicle width direction with a predetermined baseline length in the vicinity of a room mirror inside a windshield at an upper part of a vehicle compartment.

The pair of right and left images captured by the camera unit 11 as the stereo camera is subjected to matching processing to determine a pixel shift amount (parallax) at corresponding positions between the right and left images, and the pixel shift amount is converted into luminance data or the like to generate a distance image. Points on the distance image are coordinate-transformed to points in a real space with the own vehicle centered therein according to the principle of triangulation, and a lane line (lane) of a road on which the own vehicle travels, obstacles, vehicles traveling ahead of the own vehicle, etc., are three-dimensionally recognized.

A road lane line as a lane can be recognized by extracting a point group as candidates for a lane line from an image and calculating a straight line or a curved line connecting the candidate points. For instance, within a lane line detection region set on the image, edges which change in luminance by a predetermined value or more on a plurality of search lines set in a horizontal direction (vehicle width direction) are detected, and a pair of a lane line start point and a lane line end point are detected for each search line, whereby an intermediate region between the lane line start point and the lane line end point is extracted as lane line candidate points.

Time-series data of spatial coordinate positions of the lane line candidate points based on a vehicle movement amount per unit time are processed to calculate a model approximating the right and left lane lines, thereby recognizing the lane lines. As a lane line approximating model, an approximate model obtained by connecting linear components obtained by the Hough transform, or a model approximated by a curve such as a quadratic equation can be used.

The positioning device 20 mainly performs positioning based on signals from a plurality of navigation satellites such as Global Navigation Satellite System (GNSS) satellites, and detects the vehicle position of the own vehicle. When the positioning accuracy deteriorates due to a capturing state of signals (radio waves) from satellites, the influence of multipath caused by reflection of radio waves or the like, the positioning device 20 detects the vehicle position of the own vehicle by performing the positioning based on autonomous navigation using in-vehicle sensors such as a gyro sensor 22 and a vehicle speed sensor 23 in combination.

According to the positioning based on the plurality of navigation satellites, signals containing information on the orbit, time, etc., transmitted from the navigation satellites are received via a receiver 21, and the own position of the own vehicle is calculated as an absolute position containing longitude, latitude, altitude, and time information based on the received signals. Furthermore, according to the positioning based on the autonomous navigation, the position of the own vehicle as a relative positional change is measured based on the traveling azimuth of the own vehicle detected by the gyro sensor 22 and the moving distance of the own vehicle calculated from a vehicle speed pulse output from the vehicle speed sensor 23 or the like.

The map information processing device 30 includes a map database DB, and specifies and outputs the position on map data of the map database DB from position data of the own vehicle measured by the positioning device 20. The map database DB is a database that holds a high-precision map created for control of traveling containing the automatic driving, and is stored in a large-capacity storage medium such as a hard disk drive (HDD) or a solid state drive (SSD).

Specifically, the high-precision map is configured as a multi-dimensional map (dynamic map) that holds static information such as road shapes and connection relationships among roads and dynamic information such as traffic information collected by infrastructure communication in multiple layers. Road data includes the types of road lane lines, the number of traveling lanes, widths of the traveling lanes, point sequence data indicating the center position in a width direction of the traveling lane, curvature of the traveling lane, a traveling azimuth angle of the traveling lane, a speed limit, etc., and are stored together with attribute data such as data reliability and data update date.

Further, the map information processing device 30 performs maintenance management of the map database DB, verifies nodes, links, and data points of the map database DB to keep them in an up-to-date state at all time, and creates and adds new data for areas where no data exists on the database, thereby configuring a more detailed database. Update of data and addition of new data in the map database DB are performed by collating the position data measured by the positioning device 20 with the data stored in the map database DB.

The driver monitoring device 40 functions as a driver monitor for monitoring, as a driver, an occupant who is capable of performing a driving operation in the vehicle compartment on respective function units of the automatic driving control device 100 described later, particularly an occupant in the vehicle compartment who is capable of taking over driving from the automatic driving system 1 and performing the driving operation during traveling under the automatic driving. The driver monitoring device 40 transmits a driver state as a driver monitoring result to the automatic driving control device 100.

The driver state includes the driver's wakefulness level and physical condition, a motion associated with the driver's driving operation, and the like, and is detected by a plurality of sensors such as a visual sensor 41, a biological sensor 42, and the like, which are installed in the vehicle compartment. A camera, a near infrared LED, a radar, an ultrasonic sensor, or the like, which is installed in the vehicle compartment, is used as the visual sensor 41. Furthermore, a camera, a near infrared LED, a radar, an ultrasonic sensor, a temperature sensor, a vibration sensor, or the like is used as the biological sensor 42.

The driver monitoring device 40 detects the driver's facial expression or visual-line direction, the driver's hand motion and the like by the visual sensor 41, and also detects biological information such as presence/absence of the driver's breathing, heart rate, blood pressure, body temperature, and brain waves by the biological sensor 42. As described later, the automatic driving control device 100 determines the driver's reaction to a forward monitoring request or a driving takeover request to the driver based on information from the driver monitoring device 40.

The braking/driving control device 50 controls traveling driving force to be generated by an electric motor or an internal combustion engine, and also controls the traveling speed of the own vehicle, switching between forward driving and reverse driving, braking, and the like. For instance, the braking/driving control device 50 controls a driving state of the engine based on signals from various sensors that detect the driving state of the engine and various control information acquired via the communication bus 150, and controls braking devices (not illustrated) for four wheels independently of the driver's braking operation based on a brake switch, wheel speeds of the four wheels, a steering angle, a yaw rate, and other vehicle information. Furthermore, the braking/driving control device 50 calculates brake fluid pressure of each wheel based on braking force of each wheel, and performs anti-lock braking system, sideslip prevention control and the like.

The steering control device 60 controls the steering torque by an electric power steering device (EPS) 61 provided in a steering system, for instance, based on the vehicle speed, the driver's steering torque, the steering angle, the yaw rate, and other vehicle information. The control of the steering torque is executed as current control for the electric motor of the EPS device 61 that realizes a target steering torque for making the actual steering angle coincide with the target steering angle. The EPS device 61 uses the target steering torque from the steering control device 60 as an instruction torque to control driving current of the electric motor corresponding to the instruction torque, for instance, by PID control.

The information presenting device 70 is a device that controls output of an alarm for alerting the driver when abnormality occurs in various devices of the vehicle, and various kinds of information to be presented to the driver. For instance, warnings and control information are presented by using at least one of a visual output such as a monitor, a display or an alarm lamp, or an auditory output such as a speaker or a buzzer. During execution of traveling control containing the automatic driving, the information presenting device 70 presents the control state of the traveling control to the driver, and when the traveling control containing the automatic driving is suspended by the driver's operation, the information presenting device 70 presents the driving state at that time to the driver.

Next, the automatic driving control device 100 serving as a main component of the automatic driving system 1 will be described. When the driver operates a switch, a panel (not illustrated) or the like to select a driving assistance mode for assisting the driver's driving operation or an automatic driving mode requiring no driver's driving operation with respect to a manual driving mode in which the driver drives the own vehicle by performing all the driving operations such as steering, acceleration/deceleration, and braking, the automatic driving control device 100 performs traveling control via the braking/driving control device 50 and the steering control device 60 based on information from the external environment recognition device 10, the positioning device 20, and the map information processing device 30.

Note that in the present embodiment, the driving assistance mode means a driving mode which requires the driver to hold the steering wheel or steer, and automatically performs at least one of acceleration/deceleration control or steering control, and contains partially automatic driving. On the other hand, the automatic driving mode means a driving mode presupposing hands-off driving in which the driver does not touch the steering wheel, and is a conditional automatic driving mode in which all of the acceleration/deceleration control and the steering control are automatically performed in an operation region in design where the automatic driving function operates normally.

The automatic driving mode is canceled, for instance, when the driver performs an override operation such as holding the steering wheel or steering with a steering torque of a set value or more, stepping on a brake pedal, or stepping on an accelerator pedal. Furthermore, in the automatic driving mode, when it is difficult to continue the operation by the system, the automatic driving is canceled, and the driver is entrusted with manual driving.

Figure 2:
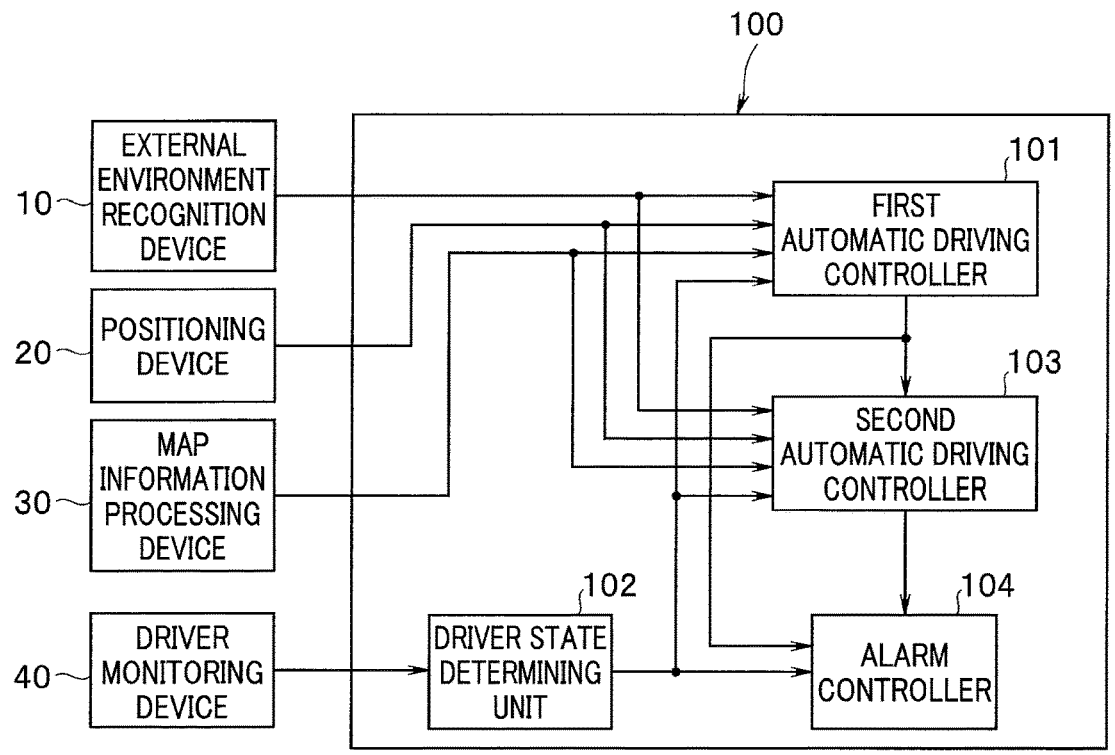
FIG. 2 is a block diagram illustrating functions of an automatic driving control device.

In the present embodiment, the automatic driving mode is subdivided into a first automatic driving mode and a second automatic driving mode. Therefore, as illustrated in FIG. 2, the automatic driving control device 100 includes a first automatic driving controller 101, a driver state determining unit 102, a second automatic driving controller 103, and an alarm controller 104 as control function units associated with respective driving modes. FIG. 2 is a block diagram illustrating functions of the automatic driving control device.

When an occupant (driver) turns on the automatic driving mode and inputs information on a destination and a waypoint (facilities names, addresses, telephone numbers, or the like) or directly specifies them on a map displayed on a panel or the like, the first automatic driving controller 101 sets position coordinates (latitudes, longitudes) of a traveling route, and specifies a traveling road and a traveling lane. The first automatic driving controller 101 performs acceleration/deceleration control and steering control by the automatic driving in the first automatic driving mode when a road condition, a geographical condition, an environmental condition, etc., satisfy conditions for the automatic driving.

When a destination and a traveling route are specified in advance, the first automatic driving controller 101 causes the own vehicle to automatically travel to the destination along the traveling route while appropriately setting a vehicle speed matched with a surrounding traffic environment, inter-vehicle distances from other vehicles and a lane. On the other hand, when neither a destination nor a traveling route is specified, the first automatic driving controller 101 causes the own vehicle to automatically travel along a lane.

The automatic driving in the first automatic driving mode presupposes that the vehicle is in a traveling environment (first traveling environment) satisfying a condition as an operation region in design which is set in advance so that the automatic driving function normally operates, for instance, the vehicle is in a stable environment in which a cause obstructing traveling of the vehicle does not occur on a road such as an expressway, a motorway or a suburban major road under a normal weather condition. In the first automatic driving mode, the driver is allowed to perform a task that is not directly related to driving, such as use of a mobile phone or reading books, and monitoring of a surrounding environment is not required.

When it is predicted that the traveling environment will change from the first traveling environment to a relatively complicated traveling environment (second traveling environment) during traveling in the first automatic driving mode in a section under the first traveling environment, the first automatic driving controller 101 outputs the forward monitoring request for requesting the driver to monitor a forward surrounding environment.

The second traveling environment is a traveling environment including at least one of a weather condition such as strong wind, rainfall or snowfall, a lane-restricted section, a speed-restricted section, a section of a curve having a large curvature, or a construction section. The first automatic driving controller 101 acquires information related to these second traveling environments by radio communication with the outside of the vehicle containing infrastructure communication for weather information from an automated meteorological data acquisition system (AMeDAS), and road traffic information from a vehicle information and communication system (VICS: Japanese registered trademark) or cloud communication with a network line based on cloud computing.

Under the second traveling environment, more complicated control is required, and the possibility that the automatic driving becomes impossible is higher as compared with the normal first traveling environment. Therefore, when it is predicted based on information acquired by communication with the outside of the vehicle that the traveling environment will change from the first traveling environment to the second traveling environment, the first automatic driving controller 101 outputs the forward monitoring request to the driver, and when the automatic driving becomes impossible, the first automatic driving controller 101 enables the driver to immediately take an action.

The driver state determining unit 102 determines whether the driver has responded to the forward monitoring request. The driver state determining unit 102 examines a driver state detected by the visual sensor 41 or the biological sensor 42 in the driver monitoring device 40 as the driver monitor, and determines whether the driver has gazed forward in response to the forward monitoring request.

For instance, when the behavior of a visual line based on movement of a virtual image on a cornea caused by the driver's eye motion, a wakefulness level based on variation in the visual-line behavior and change in pupil area, biological information on the presence or absence of the driver's breathing, heart rate, blood pressure, body temperature, brain waves, etc., the driver's face direction, the driver's hand motion, etc., are detected as the driver state, the driver state determining unit 102 determines, based on these information, whether the driver has gazed forward. For instance, the driver state determining unit 102 determines that the driver has gazed forward in response to the forward monitoring request when the driver is in a normal health condition and is awake and the driver's face direction and visual-line direction are within set ranges.

When the driver state determining unit 102 determines that the driver has gazed forward in response to the forward monitoring request, the first automatic driving controller 101 transitions the first automatic driving mode to the second automatic driving mode by the second automatic driving controller 103. The second automatic driving mode is basically the same as the first automatic driving mode, but is a more limited automatic driving mode in which deceleration, lane change, etc., are performed according to more complicated driving environments.

On the other hand, when the driver state determining unit 102 determines that the driver is not gazing forward, the first automatic driving controller 101 outputs the driving takeover request for requesting the driver to take over the driving. The driving takeover request is notified to the alarm controller 104, and the driver is alarmed from the alarm controller 104 via the information presenting device 70.

When the driver responds to the driving takeover request and checks a forward environment to operate the steering wheel, the brake pedal or the like, the driver's operation is determined by the driver state determining unit 102, the alarm issued by the alarm controller 104 is canceled, the automatic driving by the first automatic driving controller 101 is canceled, and the driving mode transitions to the manual driving mode by the driver himself/herself.

On the other hand, when the driver does not respond to the driving takeover request, the automatic driving is ceased, and the driving mode transitions to a risk reduction mode. The risk reduction mode is a driving mode for reducing a risk during the automatic driving, and ensures safety by decelerating the vehicle. The risk reduction mode includes, for instance, a retreat mode for searching a place (retreat place) such as a roadside zone where the vehicle can be safely stopped, and causing the vehicle to automatically travel to the retreat place while decelerating the vehicle and stopping there.

Note that the driving takeover request is output not only when the driver does not follow the forward monitoring request, but also when the driver may be incapable of taking over the driving because the health condition of the driver deteriorates or the like during the automatic driving in the first automatic driving mode or the second automatic driving mode. When there is no driver's response to this driving takeover request, the driving mode transitions to the risk reduction mode.

Figure 3:
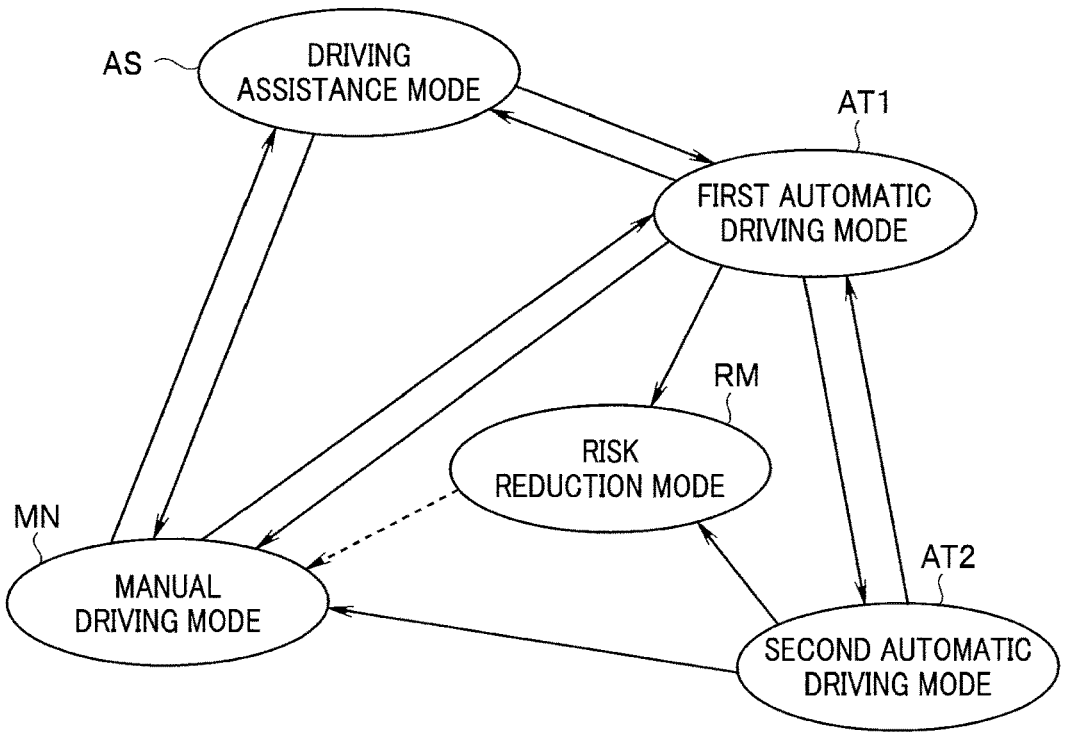
FIG. 3 is an explanatory diagram illustrating transitions among respective driving modes.

Here, the transition among the respective driving modes will be described. FIG. 3 is an explanatory diagram illustrating the transition among the respective driving modes. As illustrated in FIG. 3, the automatic driving system 1 of the present embodiment mainly includes, as the driving mode, the manual driving mode MN, the driving assistance mode AS, the first automatic driving mode AT1, and the second automatic driving mode AT2, and also includes the risk reduction mode RM.

The first automatic driving mode AT1 can be bidirectionally transitioned to each of the manual driving mode MN and the driving assistance mode AS. On the other hand, the second automatic driving mode AT2 can be bidirectionally transitioned to the first automatic driving mode AT1, but can be unidirectionally transitioned to the manual driving mode MN.

The first automatic driving mode AT1 and the second automatic driving mode AT2 transition to the risk reduction mode RM when the automatic driving is disabled. In the present embodiment, the driving mode transitions to the risk reduction mode RM when the driver does not follow the driving takeover request.

Figure 4:
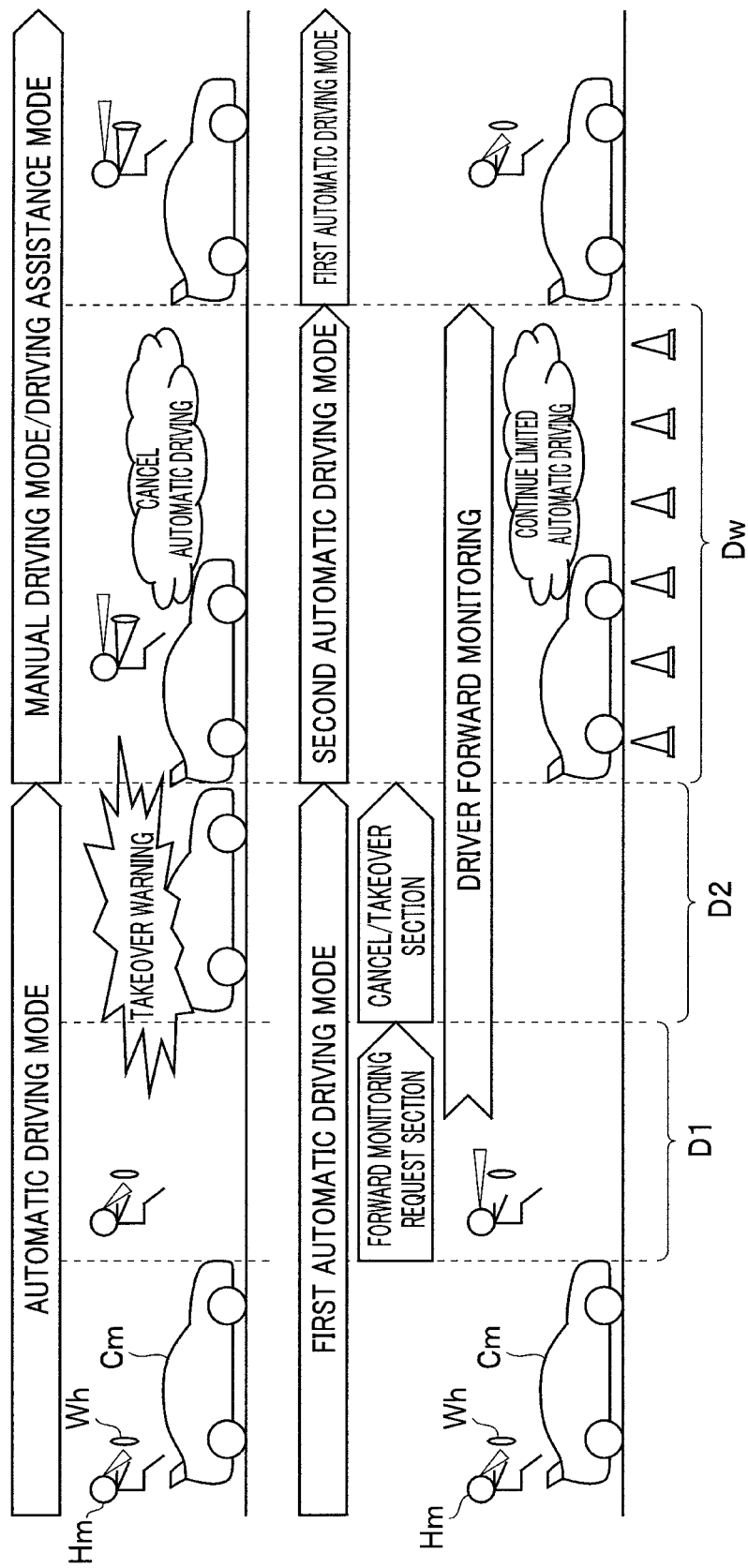
FIG. 4 is an explanatory diagram illustrating transition to a second automatic driving mode in a construction section.

The transition from the first automatic driving mode AT1 to the second automatic driving mode AT2 is performed, for instance, as illustrated in FIG. 4. FIG. 4 is an explanatory diagram illustrating a transition to the second automatic driving mode in a construction section. As illustrated in FIG. 4, while information of a construction section Dw is acquired from VICS or the like during traveling under the automatic driving in the first automatic driving mode AT1 in a state where the driver Hm of a vehicle Cm does not touch the steering wheel WH and is not monitoring a forward environment, the forward monitoring request is presented to the driver Hm in a forward monitoring request section D1 before the construction section Dw.

When the driver Hm monitors a forward surrounding environment in the forward monitoring request section D1 in response to the forward monitoring request, the driving mode transitions from the first automatic driving mode AT1 to the second automatic driving mode AT2, and the vehicle passes through the construction section Dw by the automatic driving in the second automatic driving mode AT2. At this time, the driver Hm is in a state where the driver monitors a forward environment while releasing the steering wheel WH. When the vehicle has passed through the construction section Dw, the vehicle returns to the automatic driving in the first automatic driving mode AT1 which does not require forward monitoring.

On the other hand, when the driver Hm does not respond to the forward monitoring request and is not monitoring any forward surrounding environment, the driving takeover request is presented to the driver Hm, and the first automatic driving mode AT1 is canceled in a cancel/takeover section D2 set between the forward monitoring request section D1 and the construction section Dw. The cancel/takeover section D2 corresponds to a section for issuing a takeover alarm for entrusting the driver with passing through the construction section Dw under the manual driving by the driver in a system of a normal automatic driving mode (only the first driving mode AT1) having no second automatic driving mode AT2.

The forward monitoring request section D1 and the cancel/takeover section D2 are set at a prescribed advanced distance with respect to the construction section Dw. For instance, the forward monitoring request section D1 is set based on a vehicle speed, a time required for deceleration or lane change or the like when the construction section Dw is detected, and the cancel/takeover section D2 is mainly set in consideration of a period of time required for the driver to react and then operate.

When the driver holds the steering wheel WH and monitors a forward environment in the cancel/takeover section D2 in accordance with the driving takeover request, the vehicle passes through the construction section Dw in the driving mode of the manual driving mode MN or the driving assistance mode AS. On the other hand, when the driver does not follow the driving takeover request, safety is ensured by transitioning the driving mode to the risk reduction mode RM and causing the vehicle to travel to the retreat place while decelerating and stopping there.

Note that in a case where the driving mode has transitioned to the risk reduction mode RM, the risk reduction mode RM terminates, for instance, when the vehicle stops, power is turned off and the driver operates the cancel switch. When the risk reduction mode RM terminates, the driving mode returns to the manual driving mode MN under an initial state, and a transition from the manual driving mode MN to the driving assistance mode AS or the first automatic driving mode AT1 is possible.

Next, the operation of the automatic driving system 1 will be described while focusing on the operation of the automatic driving control device 100 exemplified in a flowchart of FIG. 5. FIG. 5 is a flowchart illustrating the transition processing of the driving mode.

In first step S10, the automatic driving control device 100 determines whether the automatic driving is possible. For instance, when it becomes difficult to continue the automatic driving because abnormality occurs in a part of the system or the vehicle gets out of an operation region of the automatic driving, the automatic driving control device 100 determines that it is impossible to continue the automatic driving, and proceeds from step S10 to step S20 to entrust the driver with the driving. As a result, the vehicle travels in the manual driving mode by the driver's manual driving or travels in the driving assistance mode while assisting the driver's operation.

On the other hand, when the automatic driving is possible in step S10, the processing proceeds from step S10 to step S11, and as processing of the first automatic driving controller 101, the automatic driving control device 100 performs hands-off driving in which the driver does not touch the steering wheel, and the automatic driving in the first automatic driving mode in which the driver is not required to monitor the surrounding environment.

Thereafter, the processing proceeds from step S11 to step S12, and the first automatic driving controller 101 acquires driving environment information by radio communication with the outside of the vehicle containing infrastructure communication or cloud communication. Then, the first automatic driving controller 101 examines whether the forward monitoring required section has been detected on a traveling route of the automatic driving which is grasped from the map information. The forward monitoring required section is a section where the driver is required to monitor the forward surrounding such as a forward construction section.

In step S12, when no forward monitoring required section has been detected, the processing returns to step S11. When the forward monitoring required section has been detected and it is predicted that the traveling environment changes to the second traveling environment which is more complicated than the first traveling environment satisfying the condition of the first automatic driving mode, the processing proceeds to step S13. In step S13, the first automatic driving controller 101 outputs the forward monitoring request to the driver at a prescribed advanced distance before the forward monitoring required section, and presents the forward monitoring request to the driver. Then, in step S14, the first automatic driving controller 101 reads a determination result of the driver state by the driver state determining unit 102, and examines whether the driver has gazed forward in response to the forward monitoring request.

When it is determined in step S14 that the driver is in a forward monitoring state, the first automatic driving controller 101 causes the own vehicle to enter a forward monitoring required section in step S15, and shifts the processing to the second automatic driving controller 103 in step S16. The second automatic driving controller 103 performs the automatic driving in the second automatic driving mode which is more limited than the first automatic driving mode with the driver's forward monitoring as a condition.

On the other hand, when it is determined in step S14 that the driver is not in the forward monitoring state, the processing proceeds from step S14 to step S17, and the first automatic driving controller 101 outputs the driving takeover request for requesting the driver to take over the driving, and cancels the first automatic driving. Then, in step S18, the first automatic driving controller 101 causes the own vehicle to enter the forward monitoring required section, and examines in step S19 whether the driver touches the steering wheel in response to the driving takeover request and the driver state determining unit 102 determines whether the driver has held the steering wheel.

When it is determined in step S19 that the driver is holding the steering wheel, in step S20, the driving mode transitions to the manual driving mode or transitions to the driving assistance mode through the manual driving mode. On the other hand, when it is determined that the driver is not holding the steering wheel, the processing proceeds from step S19 to step S21 to transition to the risk reduction mode, and safety is ensured by causing the vehicle to automatically travel to the retreat place while decelerating the vehicle and stopping there.

As described above, in the present embodiment, in the case where it is predicted that the first traveling environment which does not require the driver to hold the steering wheel and preform the forward monitoring will change to the second traveling environment which requires relatively complicated control, the forward monitoring request is output to the driver before the change to the second driving environment, and when the driver monitors the forward surrounding environment in response to the forward monitoring request, the automatic driving is continued in the second automatic driving mode.

As a result, even when the traveling environment of the automatic driving deteriorates, the automatic driving can be continued as long as possible according to the driver's condition, and also the driver can quickly take over driving even when the automatic driving becomes difficult. As a result, merchantability and convenience can be improved while ensuring safety as an automatic driving vehicle.

When the driver does not follow the forward monitoring request, the driving takeover request is further output, and when the driver does not respond to this takeover request, the driving mode is caused to transition to the risk reduction mode. Therefore, the risk can be surely avoided, and safety can be ensured.

The automatic driving system 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the automatic driving control device 100 including the driver monitoring device 40, the first automatic driving controller 101, the driver state determining unit 102 and the second automatic driving controller 103 (see FIG. 2). Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIGS. 1 and 2.

Although some embodiments of the technology have been described in the foregoing by way of instance with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An automatic driving system configured to cause a vehicle to travel on a traveling route by automatic driving without a driver's driving operation, the system comprising:
   a driver monitor configured to monitor a driver capable of performing a driving operation in a vehicle compartment to detect a driver state of the driver;
   at least one processor; and
   at least one machine readable tangible medium storing instructions that, when executed by the at least one processor, causes the at least one processor to:
      determine, on a basis of the driver state, whether the driver is in a forward monitoring state where the driver monitors a forward surrounding environment;
      while the vehicle travels under a first automatic driving mode through a first traveling environment in which the forward monitoring state is not required on the traveling route, determine whether a second traveling environment in which the forward monitoring state is required is to come up ahead on the traveling route; and
      in response to determining that the second traveling environment is to come up ahead on the traveling route while the vehicle travels on the traveling route under the first automatic driving mode through the first traveling environment, output a forward monitoring request for requesting the driver to be in the forward monitoring state;
      when the driver monitor detects, in response to the forward monitoring request, that the driver is in the forward monitoring state, transition the vehicle to be controlled under a second automatic driving mode different from the first automatic driving mode through the second traveling environment on the traveling route;
      when the driver monitor detects, in response to the forward monitoring request, that the driver is not in the forward monitoring state, output a driving takeover request for requesting the driver to hold a steering wheel of the vehicle to take over driving; and
      when the driver is detected, in response to the driving takeover request, to be holding the steering wheel of the vehicle, transition the vehicle to a manual driving mode such that the vehicle travels through the second environment under the manual driving mode.

2. The automatic driving system according to claim 1, wherein when the at least one processor determines for the forward monitoring request that the driver is not in the forward monitoring state, the at least one processor cancels the first automatic driving mode before the first traveling environment changes to the second traveling environment.

3. The automatic driving system according to claim 2, wherein the second traveling environment comprises at least one of worsening of weather, a lane-restricted section, a speed-restricted section, a curved section having a large curvature, or a construction section.

4. The automatic driving system according to claim 2, wherein the at least one processor acquires information related to the second traveling environment through communication with an outside of the vehicle including infrastructure communication or cloud communication.

5. The automatic driving system according to claim 1, wherein when the at least one processor determines that the driver does not respond to the driving takeover request, the at least one processor transitions the driving mode to a risk reduction mode.

6. The automatic driving system according to claim 5, wherein the second traveling environment comprises at least one of worsening of weather, a lane-restricted section, a speed-restricted section, a curved section having a large curvature, or a construction section.

7. The automatic driving system according to claim 5, wherein the at least one processor acquires information related to the second traveling environment through communication with an outside of the vehicle including infrastructure communication or cloud communication.

8. The automatic driving system according to claim 1, wherein the second traveling environment comprises at least one of worsening of weather, a lane-restricted section, a speed-restricted section, a curved section having a large curvature, or a construction section.

9. The automatic driving system according to claim 1, wherein the at least one processor acquires information related to the second traveling environment through communication with an outside of the vehicle including infrastructure communication or cloud communication.

10. The automatic driving system according to claim 1, wherein when the at least one processor allows the driver to leave hands from the steering wheel of the vehicle while the vehicle travels on the traveling route under the first automatic driving mode and under the second automatic driving mode.

11. The automatic driving system according to claim 10, wherein the first traveling environment is a predetermined first section on the traveling route,
wherein the second traveling environment is a second section within the first section,
wherein the at least one processor determines at least one of a worse weather section, a lane regulation section, a speed regulation section, a section of a curve having a large curvature, or a construction section in the first section as the second section.

12. The automatic driving system according to claim 11, wherein when the vehicle moves from the second section to the first section while the vehicle travels on the traveling route under the second automatic driving mode, the at least one processor transitions the vehicle to be controlled under the first automatic driving mode.

13. The automatic driving system according to claim 10, wherein the first driving environment is a predetermined first section on the traveling route,
wherein the second traveling environment is a second section within the first section, and
wherein the at least one processor determines a section of a curve having a large curvature in the first section as the second section.

14. The automatic driving system according to claim 13, wherein when the vehicle moves from the second section to the first section while the vehicle travels on the traveling route under the second automatic driving mode, the at least one processor transitions the vehicle to be controlled under the first automatic driving mode.

15. An automatic driving system configured to cause a vehicle to travel by automatic driving without a driver's driving operation, the system comprising circuitry configured to
monitor a driver capable of performing a driving operation in a vehicle compartment to detect a driver state;
determine, on a basis of the driver state, whether the driver is in a forward monitoring state in which the driver monitors a forward surrounding environment; and
while the vehicle travels under a first automatic driving mode through a first traveling environment in which the forward monitoring state is not required on the traveling route, determining whether a second traveling environment in which the forward monitoring state is required is to come up ahead on the traveling route;
in response to determining that the second traveling environment is to come up ahead on the traveling route while the vehicle travels on the traveling route under the first automatic driving mode through the first, traveling environment, outputting a forward monitoring request for requesting the driver to be in the forward monitoring state;
when the driver is detected, in response to the forward monitoring request, to be in the forward monitoring state, transitioning the vehicle to be controlled under a second automatic driving mode different from the first automatic driving mode through the second traveling environment on the traveling route;
when the driver is detected, in response to the forward monitoring request, to not be in the forward monitoring state, outputting a driving takeover request for requesting the driver to hold a steering wheel of the vehicle to take over driving; and
when the driver is detected, in response to the driving takeover request, to be holding the steering wheel of the vehicle, transitioning the vehicle to a manual driving mode such that the vehicle travels through the second environment under the manual driving mode.

* * * * *